Figure 1:
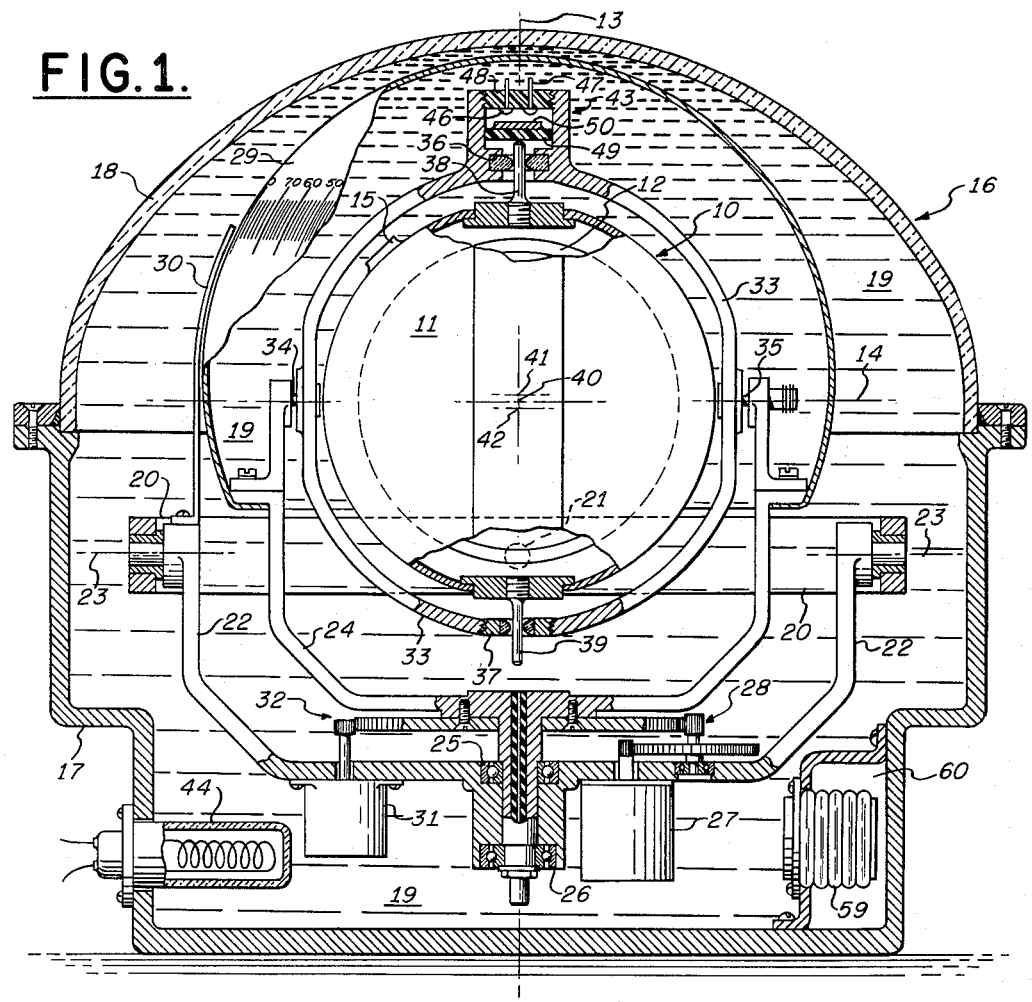

March 1, 1966 E. S. ROCKS 3,237,458
LIQUID FLOATED GYROSCOPIC APPARATUS
Filed Oct. 29, 1962

INVENTOR.
EUGENE S. ROCKS
BY
Arthur H. Serrell
ATTORNEY

United States Patent Office 3,237,458
Patented Mar. 1, 1966

3,237,458
LIQUID FLOATED GYROSCOPIC APPARATUS
Eugene S. Rocks, Northport, N.Y., assignor to Sperry Rand Corporation, Great Neck, N.Y., a corporation of Delaware
Filed Oct. 29, 1962, Ser. No. 233,577
11 Claims. (Cl. 74—5)

This invention relates to apparatus of the character having a liquid floated gyroscopic element. More particularly, the improved gyroscopic apparatus includes a spinning rotor component that is buoyantly supported in a suitable liquid with its center of gravity approximately at the intersection of vertical and horizontal axes for the purpose of eliminating bearing friction and the effect of acceleration thereon.

The present invention is an improvement in the flotation type of apparatus shown in U.S. Letters Patent No. 2,854,850 for Liquid Floated Gyroscopic Apparatus, issued October 7, 1958. In the noted patent, the temperature of the flotation liquid is thermostatically maintained within a predetermined operating range that is above atmospheric temperature. The resulting density change in the liquid of the known apparatus is prevented by adjusting the pressure in the float chamber to obtain as close a match as possible between the densities of the liquid and the floatably supported element. The patented apparatus operates to reduce density differences between the liquid and component to minimize the resulting vertical motion of the component. The average position of the moving component of the patent is theoretically one at which its center of gravity corresponds to the point of intersection of the axes when the relative densities are matched.

To more closely attain this approximate result in the improved apparatus, the pressure variable is obviated and the temperature of the liquid is varied with respect to a reference temperature at which its density matches that of the floated gyroscopic element or component. The object of the present invention is accordingly to provide an apparatus of the class described with reversible buoyancy characteristics where the density relations between the components are changed cyclically to permit the component to move away from as well as to return to its approximate condition with respect to the point of intersection of its axis. Here, the apparatus operates to vary the density of the liquid by changing its temperature with respect to a reference temperature so that there is a difference between the density of the liquid and the density of the component. The reversal of the density relations between the liquid and component is made dependent on a predetermined unidirectional vertical displacement of the component. Where the density of the liquid at its reference temperature is slightly above the density of the component, the degree of displacement permitted the component along its vertical axis is positive. Here, the floated component rises in the liquid and the density relations are reversed by heating the liquid to lower its density below that of the component to permit the component to sink to is approximate condition in relation to its axes. The range of motion permitted the component with respect to its housing is small and the desired result is obtained without the need of the precise density matching heretofore required.

One of the features of the present invention consists in the inclusion in apparatus of the class described of means for reversing the density relation between a gyroscopic float component or element and the liquid that buoyantly supports the same.

Another feature of the invention resides in the provision in the improved apparatus of a combination make-break electrical switch and undirectional motion limiter for a gyroscopic float improvement where the switch is operable to condition means for changing the temperature of the liquid.

Figure 2:
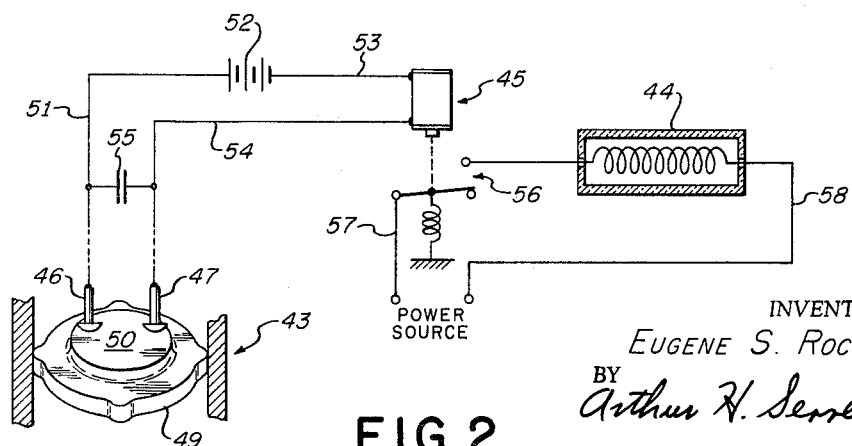

Further objects, features and structural detail of the improved gyroscopic apparatus will be apparent from the following description when read in relation to the accompanying drawing, wherein:

FIG. 1 is an east-west elevation of a gyroscopic compass in which the present inventive concepts are embodied where the housing and some of the internal parts of the apparatus are shown in cross section, and FIG. 2 is a wiring diagram of the connected electrical parts of the improved apparatus.

The floatable component or element of the improved apparatus is indicated at 10. In the compass type of apparatus shown in FIG. 1, the element 10 is formed in a closed spherical shell 11 that provides a rotor case within which a gyroscopic rotor 12 is mounted to spin about a normally horizontal north-south axis that is perpendicular to the plane of the drawing. Here, the case 11 is supported with freedom about a normally vertical minor axis 13 and a normally horizontal and east-west directed major axis 14. A conventional liquid ballastic (not shown) of the character included in the heretofore identified letters patent may be used to provide the rotor case 11 with meridian seeking properties. The compass apparatus is also preferably damped by an eccentric mass 15 located on the west side of the floatable element or component 10. The improved apparatus includes a liquid tight binnacle or housing 16 formed of a siutable base 17 and a transparent dome-shaped cover 18 that is connected to the base. The housing 16 provides a container for a liquid 19 whose density varies inversely with temperature through a relatively narrow range above the density of the component 10 and below the density of the component 10.

The compass structure shown in FIG. 1 also includes a gimbal ring 20 pivoted on the base 17 with freedom about a horizontal axis 21 normal to the plane of the drawing. The ring 20 pivotally supports the main frame 22 of the compass with freedom about a horizontal axis 23. A follow-up frame 24 is also included in the compass being pivotally mounted on the main frame with freedom about a vertical axis by means of a pair of axial spaced bearings 25 and 26. A follow-up servomotor 27 located on the frame 22 is operatively connected to the frame 24 through suitable reduction gearing 28. A dome-shaped compass card 29 is fixedly connected to the follow-up frame 24 that is read on a lubber line 30 by an observer through the transparent housing dome 18. The output transmitter of the compass apparatus shown in FIG. 1 is indicated as a synchro 31 whose rotor is operatively connected to follow-up frame 24 by way of reduction gearing 32.

The major horizontal axis 14 of the floatable element 10 of the improved apparatus is provided by a vertical gimbal ring 33 and its bearing connections 34 and 35 to the follow-up frame 24. The minor vertical axis 13 of the element or component 10 is provided by an upper bearing connection with a stationary bearing part 36 fixed to the ring 33 and a lower bearing connection with a stationary bearing part 37 fixed to the ring 33. The axially movable part of the upper bearing connection is shown as a stub shaft or trunnion 38 that is connected at one of its ends to the case 11. The lower bearing connection includes a lower trunnion 39 extending from the case 11 that with the fixed bearing part 37 also permits axial displacement of the floatable element 10 along axis 13 with relation to the ring 13 or stationary housing 16. Component 10 of the apparatus is accordingly supported in the housing 16 with axial as well as rotational freedom in relation to a normally vertical axis 13. It is further supported with rotational freedom in relation to a normally horizontal axis 14.

The improved apparatus is designed so that the average position of the center of gravity, point 40, with respect to the intersection of axes 13 and 14 is not determined by the accuracy of the matching of the relatively changing densities of the liquid and float components. Here, the axial displacement permitted the float element or component 10 along axis 13 from the condition point 40 is unidirectionally limited and the variations of the density of the liquid with temperature are utilized to provide an apparatus having reversible buoyancy characteristics. The location along axis 13 that motion of element 10 is arrested may be either positive or upward with respect to condition point 40 as indicated at 41 or negative or downward as indicated at 42. To obtain this motion, the density of the liquid is varied through a narrow range that is above and below the density of the floatable component 10 with its center of gravity approximately maintained at the intersection of the axes 13 and 14. Where the motion is positive in accordance with the preferred embodiment of the invention shown in FIG. 1, the density of the liquid at a temperature that would be cooled by the atmosphere above the density of the element. Accordingly in the positive portion of the cycle of operation of the apparatus, the buoyant component rises slowly along axis 13 to the stopping point indicated at 41.

By increasing the temperature of the liquid 19 with respect to the temperature of the liquid in the positive cycle, the density relation between the component 10 and liquid 19 is reversed to permit the component to return to the approximate condition point 40 in relation to its intersecting axes. With the density of the liquid below that of the component 10, the component moves in the reverse direction or sinks along axis 13 in the negative portion of the operating cycle of the apparatus. The means provided to reverse the density relation between component and liquid in the embodiment of the invention show in FIG. 1 include a combination make-break electrical switch and unidirectional axial motion limiter indicated at 43. The limiter 43 accordingly prevents the component 10 from rising above a predetermined gravitational center point 41 on the vertical axis 13.

The thermal means for increasing the temperature of the liquid 19 is shown in FIG. 1 as a heater 44 that is located within the housing 16 and is connected to a suitable power source of electrical energy by a relay 45 when an electrical circuit including the relay and the combination switch limiter 43 is closed. Here, the temperature of the liquid 19 is raised by the reversing means so that density of the liquid becomes lower than the density of the component 10 which sinks in the return portion of the operating cycle to its approximate condition 40 in relation to its axes. The combination switch and limiter structure 43 shown in FIG. 1 is located at the upper bearing connection between gimbal ring 33 and rotor case 11. Here, the stationary part of the structure includes two spaced contacts 46, 47 in an insulative plate 48 that are located in a plane normal to the vertical axis 13. The plate 48 closes one end of the upper bearing connection to provide a cylindrical chamber thereon in which a loosely fitting insulative cylindrical piece 49 is movable axially along the axis 13. One end of the axially movable part of the structure 43 includes a single flat electrical contact 50 that is arranged to bridge the contacts 46 and 47 of the stationary part of the structure 43 to simultaneously close the switch and limit the axial movement of the component 10 in one direction. Piece 49 is constructed of material whose density is slightly above that of the component 10 so that axial motion thereof is dependent on the engagement between it and the end of the axially movable trunnion or stub shaft 38 of the upper bearing connection.

As shown in FIG. 2, engagement of contacts 46, 47 and 50 close a circuit to the coil of relay 45 including lead 51, battery 52 and leads 53, 54. A condenser 55 may be provided across leads 51, 54 to prevent sparking between the contacts of the switch and limiter structure. The operation of relay 45 moves its armature to close the switch 56 thereby connecting a power supply to the heater 44 by way of leads 57 and 58. The return cycle of the apparatus is provided by the operation of the heater 44 to raise the temperature of the liquid 19 to a level that reverses the density relation between the element 10 and liquid 19 and permits the element 10 to sink to its approximate condition in relation to its axes.

In the improved apparatus, the liquid 19 provided fills the housing 16 and the internal portion of a bellows unit 59 that operates in a substantially evacuated chamber 60. This permits the volume of the liquid to change as the temperature thereof varies during the operation of the apparatus without pressure influences. In the embodiment of the invention shown, the reference temperature of liquid 19 is well above that normally encountered external ot the housing 16.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In gyroscopic apparatus of the flotation type, a floatable component with a gyroscopic rotor, a housing in which the component is mounted with rotational and axial freedom in relation to a normally vertical axis and rotational freedom in relation to a normally horizontal axis, a liquid in the housing whose density varies inversely with temperature through a relatively narrow range above the density of the component and below the density of the component buoyantly supporting the component with the average position of its center of gravity approximately at the intersection of the axes; and means for reversing the density relation between the component and liquid cyclically including a combination make-break electrical switch and unidirectional axial motion limiter having a terminal-stop part fixed in relation to the vertical axis of the component and a terminal-stop part movable with the component along its vertical axis to simultaneously close the switch and limit the axial movement of the component, and circuit means operable to vary the density of the liquid through its relatively narrow range including the closed switch and means for changing the temperature of the liquid in the housing.

2. Apparatus as claimed in claim 1, in which density of the liquid is above that of the component so that the liquid is above that of the component so that the component rises in positive cyclic operation, and the temperature changing means raises the temperature of the liquid to lower its density so that the component sinks in negative cyclic operation.

3. Apparatus as claimed in claim 1, in which the fixed terminal-stop part includes two spaced contacts located in a plane normal to the vertical axis of the floatable component and the movable terminal-stop part includes a single contact arranged to bridge the contacts of the fixed part.

4. In gyroscopic apparatus of the flotation type, a floatable element having a gyroscopic rotor, a chamber in which the element is mounted with rotational and axial freedom in relation to a normally vertical axis and rotational freedom in relation to a normally horizontal axis, a liquid in the chamber whose density varies inversely with temperature through a relatively narrow range above the density of the element and below the density of the element buoyantly supporting the element with the average position of its center of gravity approximately at the intersection of the axes, a combination make-break switch and unidirectional axial motion limiter having a stationary part and a cooperating part movable with the element along the vertical axis, and thermal means operable with the engagement of the parts of the combined switch and limiter for changing the temperature of the liquid in the chamber to reverse the density relation between the element and liquid cyclically.

5. Apparatus of the character claimed in claim 4, in which the density relations between the liquid and element are such that in positive cyclic operation the parts of the combined switch and limiter limit the upward vertical movement of the element.

6. Apparatus of the character claimed in claim 4, in which the thermal means raises the temperature of the liquid so that in negative cyclic operation the density of the liquid goes below the density of the element.

7. In a gyroscopic apparatus of the flotation type, a floatable element having a gyroscopic rotor, a housing in which the element is mounted with rotational and axial freedom about a normally vertical axis and rotational freedom about a normally horizontal axis, a liquid in the housing whose density varies inversely with temperature through a relatively narrow range above the density of the element and below the density of the element buoyantly supporting the element with the average position of its center of gravity approximately at the intersection of the axes; a combination make-break switch and axial motion limiter having a stationary part and a part movable with the element along the vertical axis, and the thermal means for raising the temperature of the liquid to reverse the density relation between the element and liquid cyclically upon engagement of the parts of the combined switch and limiter.

8. Apparatus of the character claimed in claim 7 in which one of the parts of the combined switch and limiter includes two spaced contacts located in a plane normal to the vertical axis of the element.

9. In a gyroscopic apparatus of the flotation type, a floatable component having a gyroscopic rotor, a housing gimbal means in the housing on which the component is mounted with freedom about a normally horizontal axis and a normally vertical axis, a liquid in the housing whose density varies inversely with temperature through a relatively narrow range above the density of the component and below the density of the component buoyantly supporting the component with the average position of its center of gravity approximately at the intersection of the axes; means for reversing the density relation between the component and liquid cyclically including a connection at the vertical axis having an axially movable bearing part, a relatively stationary bearing part fixed to the gimbal means, a combined electrical switch and axial motion limiter having a first part fixed to the stationary bearing part, and a second part movable with the movable bearing part; and thermal means dependent on the engagement of the combined switch and limiter parts for raising the temperature of the liquid in the housing to lower the density of the liquid below the density of the component.

10. Apparatus as claimed in claim 9, in which the axially movable bearing part is a stub shaft whose end engages the second movable part of the combined switch and limiter.

11. In gyroscopic apparatus of the flotation type, a floatable element having a gyroscopic rotor, a housing in which the element is mounted with rotational and axial freedom in relation to a normally vertical axis and rotational freedom in relation to a normally horizontal axis, a liquid in the housing whose density varies inversely with temperature through a relatively narrow range above the density of the element and below the density of the element buoyantly supporting the element with its center of gravity approximately at the intersection of the axes; and means operatively connected to the floatable element and the housing dependent on a predetermined positive vertical displacement of the element for cyclically heating the liquid to lower the density of the liquid below the density of the element.

References Cited by the Examiner
UNITED STATES PATENTS 2,854,850 10/1958 Braddon _____ 74—5
2,937,533 3/1960 Barkalow _____ 74—5.5

BROUGHTON G. DURHAM, *Primary Examiner.*